US008977961B2

(12) United States Patent
Vaidya et al.

(10) Patent No.: US 8,977,961 B2
(45) Date of Patent: Mar. 10, 2015

(54) GESTURE BASED CONTEXT-SENSITIVE FUNCTIONALITY

(71) Applicant: Cellco Partnership, Basking Ridge, NJ (US)

(72) Inventors: Samir S. Vaidya, Highland Park, NJ (US); Mauricio P. Caldeira De Andrada, South Plainfield, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 151 days.

(21) Appl. No.: 13/653,100

(22) Filed: Oct. 16, 2012

(65) Prior Publication Data

US 2014/0108927 A1   Apr. 17, 2014

(51) Int. Cl.
*G06F 3/048* (2013.01)

(52) U.S. Cl.
USPC ............................ 715/708; 715/863; 715/864

(58) Field of Classification Search
None
See application file for complete search history.

(56) References Cited

U.S. PATENT DOCUMENTS

| 8,432,368 | B2 * | 4/2013 | Momeyer et al. ............. 345/173 |
| 2006/0242607 | A1 * | 10/2006 | Hudson .......................... 715/863 |
| 2010/0076642 | A1 * | 3/2010 | Hoffberg et al. ................. 701/29 |
| 2010/0095234 | A1 * | 4/2010 | Lane et al. ..................... 715/773 |
| 2011/0041102 | A1 * | 2/2011 | Kim ............................... 715/863 |
| 2011/0055753 | A1 * | 3/2011 | Horodezky et al. ............ 715/810 |
| 2011/0066984 | A1 * | 3/2011 | Li .................................. 715/863 |
| 2011/0167391 | A1 * | 7/2011 | Momeyer et al. .............. 715/863 |
| 2012/0019465 | A1 * | 1/2012 | Chen et al. ..................... 345/173 |
| 2012/0127082 | A1 * | 5/2012 | Kushler et al. ................ 345/169 |
| 2012/0329529 | A1 * | 12/2012 | van der Raadt ............... 455/566 |
| 2013/0238990 | A1 * | 9/2013 | Ubillos et al. ................. 715/708 |
| 2013/0239052 | A1 * | 9/2013 | Moody et al. ................. 715/810 |

OTHER PUBLICATIONS

Google Mobile, Gesture Search, www.google.com/mobile/gesture-search/ Version 1.4.0 (May 23, 2011).
"Google Invents an Original Search Gesture for Future Devices", Patently Apple, Feb. 24, 2012.
"Bing Bing for iPad Update: Searching Without a Search Box", Bing, Jul. 5, 2011.

* cited by examiner

*Primary Examiner* — Matt Kim
*Assistant Examiner* — Hua Lu (57) ABSTRACT

Gesture based, context sensitive help and search functionalities are provided for application programs on a mobile device. In response to detecting movement at a mobile device in the form of a gesture, it is determined whether the movement corresponds to a predetermined gesture for invoking a help or search functionality. When the movement corresponds to a predetermined gesture, a current context of mobile device is identified and help content associated with the identified current context is retrieved for the help functionality, or a search query associated with the context is invoked and search results are obtained for a search functionality, for presentation to the user of the mobile device.

18 Claims, 7 Drawing Sheets

GESTURE BASED CONTEXT-SENSITIVE FUNCTIONALITY

BACKGROUND

The advancement of mobile communication devices and networks in recent years has allowed users of such devices to access different types of content and services directly on the users' mobile devices. Many operators of modern mobile communication networks offer their users or subscribers advanced data communication services, in addition to standard wireless mobile communication services such as for voice calls or mobile messaging services (e.g., text and/or multimedia). For example, an email client application may be installed on a user's mobile device for accessing functionality provided by an email service for an email account associated with the user. The client application may enable the user to send and receive email messages directly from the user's mobile device.

However, some users may have difficulty configuring the client application program at the mobile device or accessing particular functionality provided by the service via the application program. In the email example above, in order to access the functionality provided by the service, the user may first need to configure the client application with various settings related to the user's email account and the associated email exchange server that hosts the email service. As the configuration process may require the user to specify a number of different configuration options with which the user may not be familiar, the user may need assistance or additional information in order to successfully complete the process. Consequently, the user may contact the service provider for help or try to find the information through a third-party resource including, for example, online resources in the form of a web page after performing an online search query using a web search engine. Although the particular client application may include a help feature with additional information, the user may be unaware that such a feature is available or how to access the feature using the interface of the client application.

In addition, some users may have difficulty initiating search queries on mobile devices. For example, a user may be viewing an image on their mobile device and desire to conduct a search for more information regarding the content of the image. Traditionally, the user would be required to manually launch a search application and enter the necessary search query, which can be time consuming and prone to user error.

BRIEF DESCRIPTION OF THE DRAWINGS

The figures depict one or more implementations in accordance with the present teachings, by way of example only, not by way of limitation. In the figures, like reference numerals refer to the same or similar elements.

DETAILED DESCRIPTION OF THE PREFERRED EMBODIMENTS

In the following detailed description, numerous specific details are set forth by way of examples. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The systems and techniques disclosed herein relate to responding to gesture based user input to a mobile device based on the context of the active client application of the user's mobile device. This may include, for example, enabling a user of a mobile device to quickly invoke a help functionality by simply moving the device in accordance with a predetermined physical gesture.

The terms "gesture" and "physical gesture" are used interchangeably herein to refer to any type of user input for controlling a user interface of a computing device that incorporates a characteristic movement implemented by the user (e.g., moving the device in a particular way, moving a touching digit or other object across a touch screen in a particular way, or making a particular physical movement within the field of view of a camera of the mobile device). In an example, the device is a mobile device equipped with various sensors for detecting different types of gestures. An example of a type of device movement gesture that may be detected using one or more sensors of the device includes, but is not limited to, shaking the device itself laterally or longitudinally some number of times. Examples of different types of touch gestures include touching a mobile device's touch-screen display so as to form a closed path (such as a circle or rectangle) around a term, phrase or image to be searched or moving the touching digit or object across the touch screen so as to form a question mark. Examples of different possible movements detected using a digital camera of the device included but are not limited to a user's waving their hand or nodding their head within the field of view of the camera.

Typically, the mobile device would be configured to detect a number of distinguishable physical gestures. For example, one or more such gestures would be associated with a help functionality so that the mobile device activates a help functionality upon detection of the user's performance of the associated gesture, while a distinguishable gesture would be associated with a search functionality. Each gesture may or may not be linked logically with the functionality. In an example of logical linkage, to trigger a help functionality, a capital "H" (or more letters of "HELP") may be used while to trigger a search functionality, a capital "S" may be used. In a different example of random linkage, to trigger a help functionality, a "1" may be used while to trigger a search functionality, a capital "2" may be used. In addition, the mobile device can be configured to detect a combination of two or more gestures to activate a particular functionality. For example, a gesture invoking a search functionality could entail the combination of the user touching the touch screen at the location of a particular word on the screen while moving the mobile device in a predetermined pattern to invoke a search query for the particular word.

Using the physical device motion gesture example above, a predetermined physical gesture may be detected based on motion input detected by an accelerometer and/or gyroscope of the mobile device. As will be described in further detail below, to invoke the functionality associated with this predetermined physical gesture, the user of the mobile device may be required to move the physical mobile device in a predefined manner, e.g., according to a predetermined pattern. The mobile device will identify a user's movement of the device as a gesture input and distinguish it from other types of physical movement of the device during general use of the mobile device, such as motion created by a user's walking with the device or transferring the device from one location to another.

In some implementations, one or more physical gestures for invoking help or search functionalities described herein may be preconfigured for the mobile device or one or more specific client applications executable at the device. In other implementations, physical gestures for invoking functionalities may be configurable by the user by, for example, a gesture control settings panel provided through an interface of the mobile device.

In an example, a gesture based help functionality may be provided through a client application (which may be referred to herein as a helper client application) installed and implemented on the mobile device. Such a helper client application may be configured to execute as, for example, a background service or process on the mobile device in conjunction with other application programs running on the mobile device and to provide context-sensitive assistance to the user, e.g., assistance based on the state of the mobile device. For example, if a user is in the process of configuring an email account and carries out a gesture configured for invoking the help functionality, the helper client application would detect that the user is in the process of configuring an email account and provide assistance related to email configuration, such as by searching for and presenting help text, graphics, audio, and/or video related to configuring an email account or by initiating a search query related to configuring an email account. Accordingly, a gesture based help functionality may be invoked by the user to obtain help or support information (also referred to herein as "help content") related to each of one or more different application programs executable at the user's device.

For a multi-tasking mobile platform or operating system in which multiple applications may be executed in parallel at the mobile device, the relevant application program for purposes of providing the appropriate help content to the user may be identified based on, for example, context information stored in a program execution or call stack by the processor of the mobile device during program execution. The relevant application program may be identified as the program that is currently in use and that is the primary focus of system resources allocated at the mobile device for its execution. The application program of focus may be, for example, the source of application content being displayed currently on the display screen of the device as well as the operations/tasks being executed currently by the processor.

In another example, a gesture based search functionality may be similarly provided. For example, a user may be viewing an image on their mobile device and desire to conduct a search for more information regarding the image. Rather than switching to a search application and inputting a search query, the user will carry out a gesture configured for invoking the search functionality. A search client application may detect that the user is presently viewing an image and then create and invoke a search query related to the image by, for example, using information associated with the image, such as location information, file name, a hash of the image, a version of the image compressed in a particular manner, or other image related information to form the query. In another example, the search client application can conduct an image search by sending the image as a search query to return other images that may contain more information regarding the image or return similar images that might be of interest. In still another example, the search client application can run multiple search queries with different techniques and present the combined results to the user. In still another example, the search client application may detect that the user is presently viewing a contact in their address book and then create and invoke a search query related to that contact by, for example, using the name of the contact and tailoring the search query towards social networking sites. Other examples may include detection of and invocation of search queries for videos, e-books, web pages, text, games, or other applications. The search queries are formulated using information related to the context of the mobile device, which may include the material presented to the user, metadata or other information related to the material presented to the user, and the status of the mobile device. The contents of the search results are presented to the user of the mobile device in response to the search gesture.

Reference now is made in detail to the examples illustrated in the accompanying drawings and discussed below. An exemplary communication network environment 100 is described initially with respect to FIG. 1. The network environment 100 provides a variety of communication services between different client devices and servers, including communications for context sensitive help for different client application programs executable at a mobile device 110 of a user based on a predetermined physical gesture performed by the user and detected by the mobile device 110.

Following the description of network environment 100, network systems and processes related to providing such gesture based, context sensitive help and search functionality at the user's mobile device will be described in further detail below using the examples illustrated in FIGS. 2-6. However, it should be noted that the subject technology is not intended to be limited to these examples.

Figure 1:
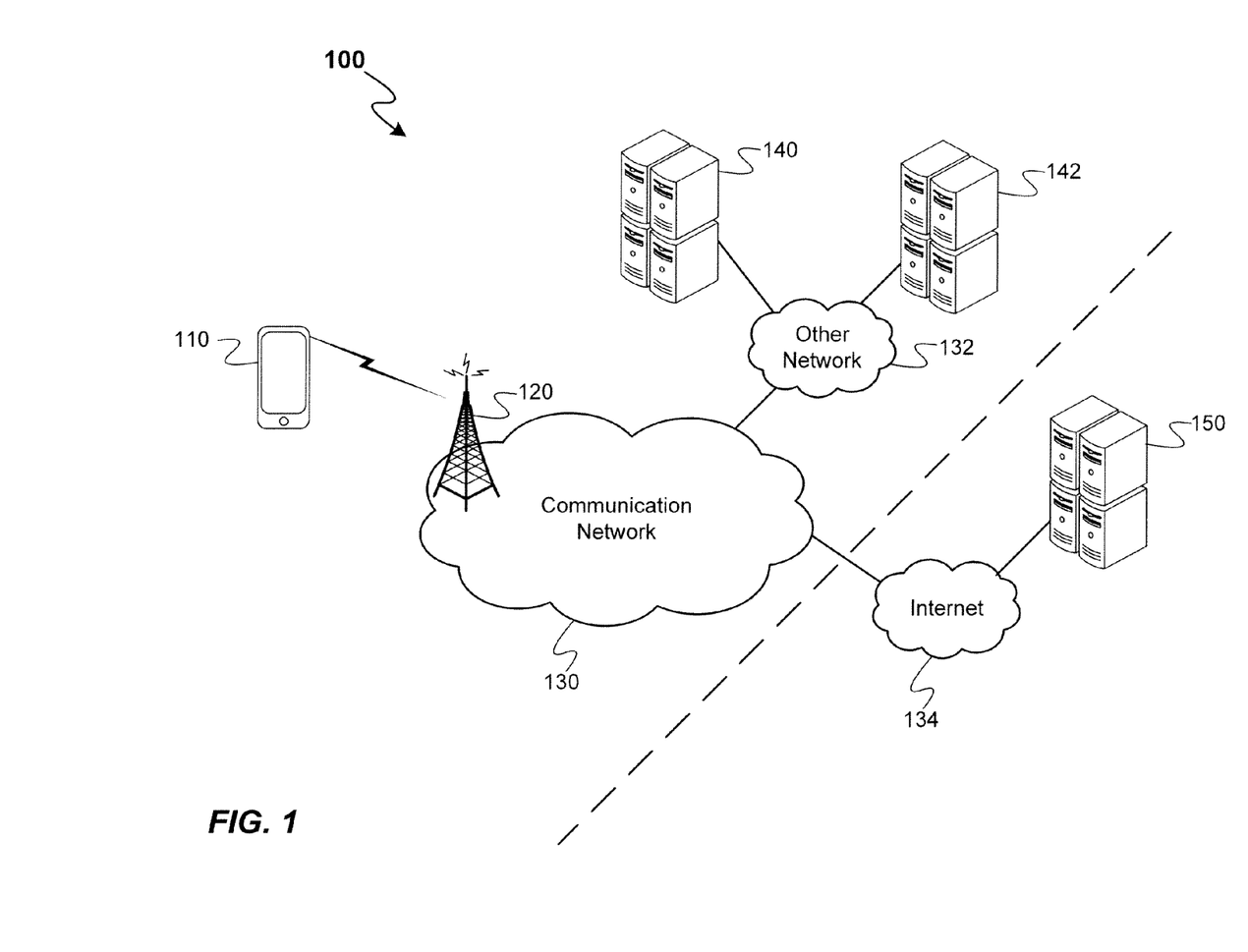
FIG. 1 illustrates an exemplary communication network environment for providing a variety of mobile communication services to a user of a mobile device, including a service for providing context sensitive help information to a user of a mobile device in response to a physical gesture input by the user at the device.

As will be described in further detail below, gesture based functionality may be provided to a user of the mobile device 110 as part of a service hosted at a server through a mobile communication network 130. For example, the service may be provided to the mobile device user by a wireless carrier or operator of mobile communication network 130 via an interface at the mobile device 110. The mobile device user in this example also may be a subscriber of various communication services provided by the wireless carrier through the mobile communication network 130 to the user's mobile device 110. The gesture based functionality may also be provided to a user of the mobile device 110 as a service hosted on the mobile device 110 in communication with a mobile communication network 130, or by some combination of hosting on the mobile device 110 and server. In a further example, the interface may be a client application executable at the mobile device 110 that configures the mobile device 110 to communicate with an associated application server through the mobile communication network 130. The communication from the mobile device 110 may be in the form of a request message requesting context sensitive help content associated with a current context of an application program currently executing at the mobile device 110.

In some implementations, a client application may be configured to execute as a background process, which monitors for physical gesture based input using one or more different sensors of the mobile device 110, such as, for example, an accelerometer, a gyroscope, an integrated digital camera, or a touch-screen display. For example, the client application may be configured to monitor or receive motion input detected by an accelerometer of the mobile device. The client application may then determine whether the detected motion input corresponds to a predetermined physical gesture associated with the help functionality, as will be described in further detail below. In addition, certain predetermined gestures may use a combination of sensors for detection. For example, a gesture entailing movement of the device may include both acceleration and rotation of the device and may use both an accelerometer and a gyroscope for detection. In another example, where the mobile device is configured to detect a combination of two or more gestures to activate a particular functionality as described above it may use two or more sensors to detect the two or more gestures.

In the example illustrated in FIG. 1, the network environment 100 includes a mobile client device 110, which transmits requests to one or more servers 140, 142 and/or 144 through a communication network 130 via base station 120. Communication network 130 can interconnect with other networks such as network 132 and the Internet 134. As noted above, network environment 100 as illustrated in FIG. 1 can be used to provide a variety of communications, including communications for gesture based help or search functionalities provided to a user at mobile device 110 for invoking context sensitive functionality for one or more application programs executable at mobile device 110.

For example, mobile device 110 can be configured to execute a client application associated with a helper service hosted at, for example, server 140. In this example, mobile device 110 communicates through communication network 130 with server 140 for requesting help content for a particular application program executing at mobile device 110. Further, the mobile device 110 may send a request for such help content in response to a predetermined physical gesture performed by the user and detected by mobile device 110. For detecting gestures in the form of user movement of the device, mobile device 110 is equipped with an accelerometer. The motion input detected by mobile device 110 through its accelerometer can be used by the helper client application to determine whether the motion input corresponds to a predetermined physical gesture associated with the context-sensitive help functionality, as will be described in further detail below. Further, server 140 can be configured to provide such help content by enabling various types of functionality to mobile device 110 through a local area network or wide area network such as the Internet (134). For instance, in response to a gesture corresponding to the help functionality, the mobile device 110 may send information about its current status to server 140. Server 140 uses the received information to determine the state of mobile device 110 and identify the context of the help gesture. To determine how to respond to the help gesture, server 140 may access a local database or file system or may obtain information provided by other servers, via network 132, such as server 142, or via the Internet (134), such as server 150. Server 140 uses such information to formulate a response, which may include instructions, answers to frequently-asked-questions (FAQ), how-to videos, or other information related to the state of the mobile device. Server 140 transmits the response to mobile device 110 to be displayed as help content responding to the help gesture. In another example, the help content is audio content and is presented to the user as audio in response to the help gesture.

Communication network 130 of network environment 100 facilitates communications between various types of client devices and at least one server for purposes of client access to the functionality of a helper service hosted at the server. Such functionality can be implemented in the form of an automated interface including one or more processing functions accessible to mobile device 110, as described above. In some implementations, network 130 is a mobile communication network that supports communications for different mobile devices or other types of computing devices in addition to devices that execute client applications and participate in services hosted by servers 140 and/or 142. Network 130 can thus be any network or combination of networks in an overall communication network for transmitting data communications between various devices associated with the communication network. Network 130 can include, but is not limited to, a wired (e.g., Ethernet) or a wireless (e.g., Wi-fi or 4G) network. In addition, network 130 can include a local area network, medium area network, and/or wide area network. Network 130 can support protocols and technology including, but not limited to, Internet or World Wide Web protocols and communication services. Intermediate network routers, gateways, or servers may be provided between the network components/devices of network environment 100 as may be desired in some implementations of network or computing environments.

While the example in FIG. 1 shows only mobile device 110, the network environment 100 can be used to facilitate data communications for additional devices (not shown) over communication network 130. Similarly, network environment 100 can include other servers (not shown) in addition to servers 140, 142 and 144 for communicating with one or more of the client devices. Furthermore, the subject technology may be implemented in communication network 130 using any of a variety of available communication networks. As such, FIG. 1 is used herein to provide only a very simplified example of a few relevant elements of network environment 100 including communication network 130, for purposes of discussion and explanation of the subject technology.

Mobile device 110 in this example is configured to access a help service for context-sensitive help functionality in response to a predetermined gesture detected using an accelerometer of mobile device 110. In other examples, the gesture may be detected using another sensor or a combination of sensors. In another example, mobile device 110 is configured to access a search service for context-sensitive search functionality in response to a predetermined gesture corresponding to the search functionality. In still another example, the mobile device 110 is configured to determine whether a gesture was carried out by the user to request help or to invoke a search based on the context of the mobile device 110 and independently of the particular gesture carried out. The mobile device 110 may analyze the status of the device by, for instance, checking for errors (such as software exceptions or active error codes), checking for common situations requiring help (such as the email configuration example described below), or searching for help content corresponding to the current context of the device to determine whether there is a potential issue requiring help. When relevant help content is available or an issue is identified for which help content is available, the gesture is identified as a help gesture and if there is no issue the gesture is identified as a search gesture.

In the example shown in FIG. 1, mobile device 110 is configured to access mobile wireless communication services through network 130, for example, via a base station 120. In another example, the services may be hosted on the mobile device 110 itself and the mobile device 110 may carry out some or all of the steps described above as being carried out by server 140. Mobile device 110 is intended to provide just one example of a type of device that may be used for communicating with a web service hosted at server 140. Mobile device 110 can be any type of mobile computing device that is capable of data communications over one or more networks and that includes a sensor for detecting one or more gestures. Examples of such a mobile computing device include, but are not limited to, mobile handsets, cellular smart phones, and tablet computers. An example of a mobile device for implementing the above-described context-sensitive functionality based on gesture input received at the device will be described further below in reference to FIG. 2.

Figure 2:
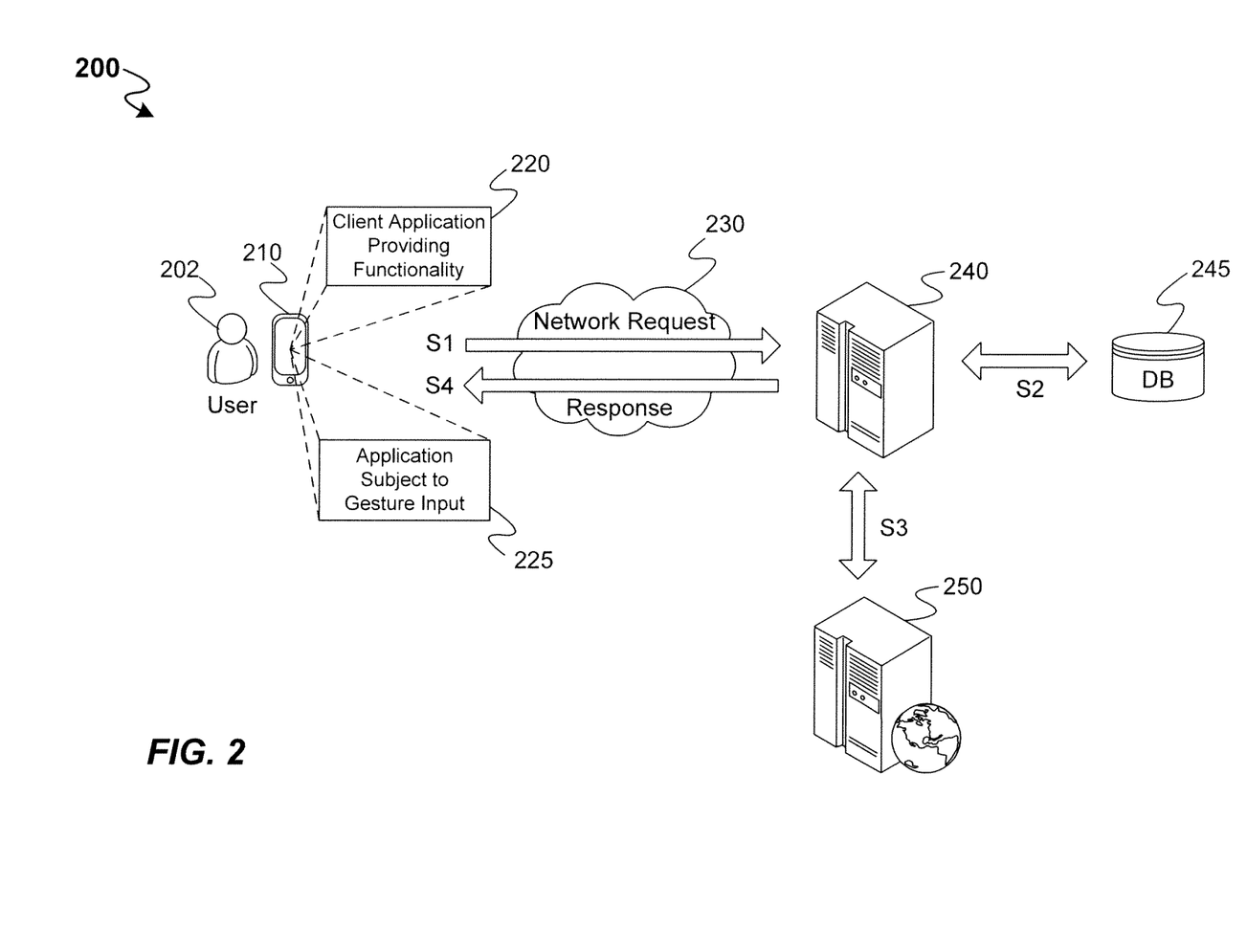
FIG. 2 is a block diagram illustrating an exemplary system for providing context sensitive help information to a user of a mobile device based on a physical gesture input by the user at the device.

FIG. 2 is a block diagram illustrating an exemplary system 200 for providing context sensitive functionality to a user of a mobile device based on a physical gesture input by the user at the device. For purposes of discussion, system 200 will be described in relation to providing context sensitive help functionality and with reference to one or more components of network environment 100 of FIG. 1, as described above, but system 200 is not intended to be limited thereto.

As shown in FIG. 2, a mobile device 210 of a user 202 communicates with an application server 240 through a network 230. Mobile device 210 can be any type of mobile computing device with at least a processor, a memory, a display and one or more sensors (e.g., a touch-screen display). Examples of such mobile computing devices include, but are not limited to, portable handsets, smart-phones, tablet computers, and personal digital assistants. Mobile device 210 also may be implemented using, for example, mobile device 110 of network environment 100 of FIG. 1, as described above, but mobile device 210 is not intended to be limited thereto. Similarly, application server 240 can be implemented using any general-purpose computer capable of serving data to mobile device 210. Server 240 communicates with a database 245. Database 245 may store any type of data accessible by server 240, including help content associated with one or more application programs, as will be described in further detail below.

Network 230 can be any network or combination of networks in an overall mobile communication network for transmitting data communications between various devices including various client devices and servers in a distributed network environment (e.g., network environment 100 of FIG. 1, as described above). Network 230 can include, but is not limited to, a wired (e.g., Ethernet) or a wireless (e.g., Wi-fi or 3G) network. In addition, network 230 can include, but is not limited to, a local area network, medium area network, and/or wide area network such as the Internet. Network 230 can support protocols and technology including, but not limited to, Internet or World Wide Web protocols and communication services. Using the example network environment 100 of FIG. 1, network 230 may be implemented using, for example, one or more of networks 130, 132 and 134, as described above. Intermediate network devices (e.g., routers, gateway devices or other servers) can be provided between the components of system 200 as may be desired when implementing the subject technology as described herein. In an example, network 230 is a mobile communication network associated with a wireless carrier or network operator. Thus, user 202 in this example may be a subscriber of various communication services provided by the wireless carrier via mobile device 210.

In the example shown in FIG. 2, mobile device 210 executes a client application 220 for implementing the gesture based help functionality for user 202. Client application 220 enables user 202 to invoke a context sensitive help function by monitoring for a predetermined physical gesture input at mobile device 210. As described above, such a predetermined physical gesture may include, for example and without limitation, motion input detected by mobile device 210. Mobile device 210 in this example includes one or more motion sensors (e.g., an accelerometer, a gyroscope) for detecting such motion input from a user at the mobile device. The motion detected by the motion sensor(s) of mobile device 210 includes, for example, a change in the physical position and/or orientation of the device in any direction within three-dimensional space. Such motion detection also includes, but is not limited to, detecting a rate of change in position and/or orientation of the device. In this way, mobile device 210 can monitor or track whether the detected motion or movement of the device, including the rate of such motion, occurs according to a pattern associated with the predetermined physical gesture. In some implementations, detecting such a pattern of motion may include determining whether one or more predetermined threshold parameters are satisfied. This may include, for example and without limitation, determining whether the detected motion of mobile device 210 exceeds a predetermined threshold rate of speed or acceleration or whether the motion or movement (e.g., change in position or orientation) of mobile device 210 occurs in a particular direction or along a particular axis in three-dimensional coordinate space.

User 202 in this example may need to invoke such help functionality to obtain help or support information related to another application running on mobile device 210. For example, the application program may be an electronic mail (or "email") application program for sending and receiving email messages from mobile device 210. In order to use the email application program, user 202 must first configure the email application with the relevant settings and user options that may be associated with a third-part), email account of user 202. However, proper configuration of the email application in this example may require user 202 to specify different configuration options across multiple pages, as shown by the example in FIG. 3.

Figure 3:
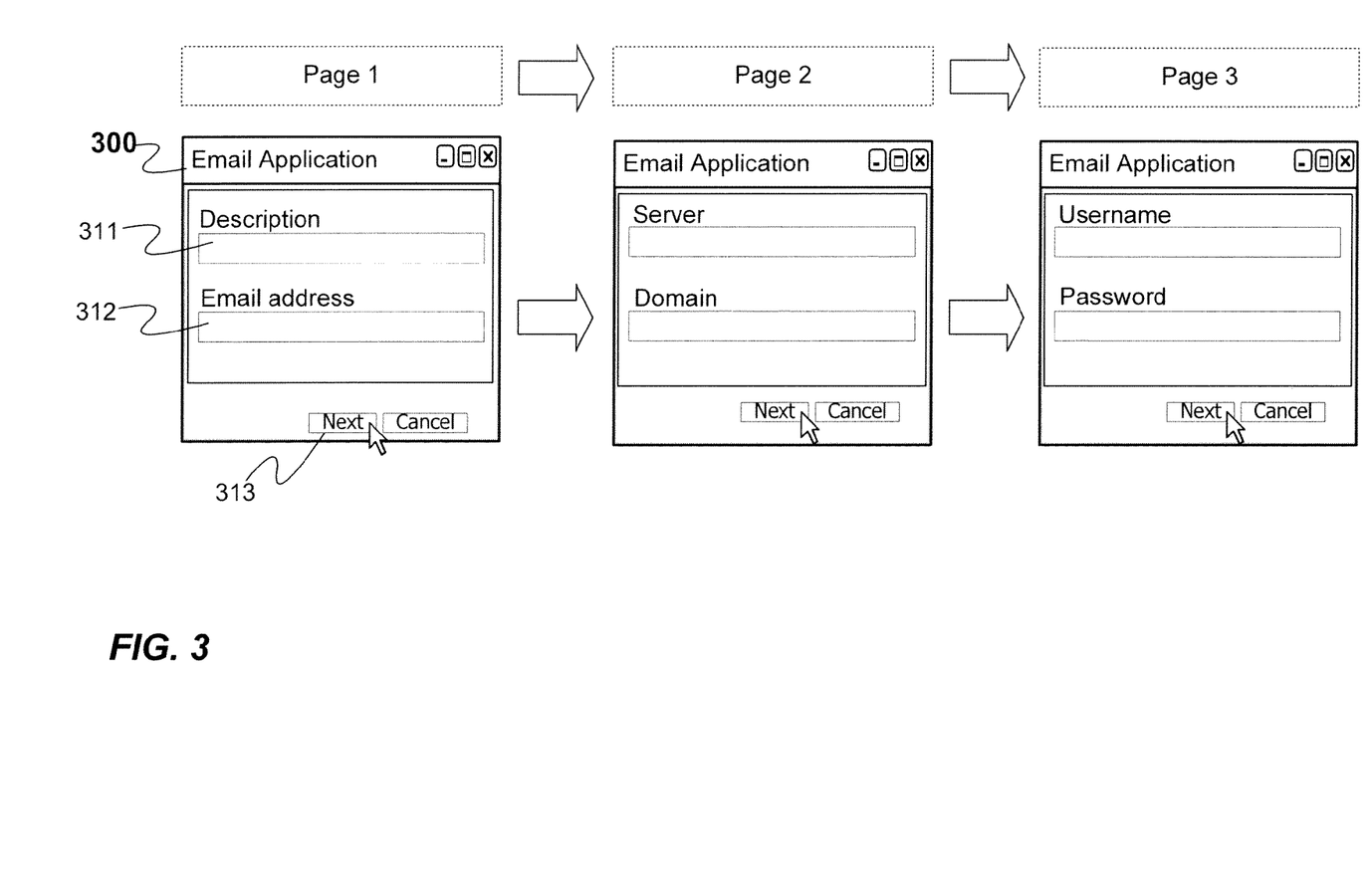
FIG. 3 shows different contexts across multiple pages of an exemplary graphical user interface of an application program executable at the user's mobile device.

FIG. 3 shows different pages (labeled as Pages 1 through 3) of a multi-step process for configuring a mobile email application 300. As shown in FIG. 3, each page includes a number of user fields, such as fields 311 and 312, for entering configuration settings for email application 300. For instance, Page 1 contains fields for a description of the email account (e.g., personal email, work email) and the email address. Page 2 contains fields for the address and domain of the email server for the email account. Page 3 contains fields for the username and password. Each page further includes user control elements (e.g., control button 313), which the user may select for interacting with the interface. In this example, the interface for configuring email application 300 does not provide any additional information describing the various fields of the interface, which would be helpful to users who may not be familiar with email application 300 or how to configure such applications generally. Also, the interface of email application 300 does not provide any indication of how such users may find such information needed to configure the application.

Referring back to FIG. 2, gesture based help functionality provided to user 202 at mobile device 210 allows user 202 to quickly request help information associated with an application program that is executing at mobile device 210 and that user 202 is currently using or attempting to use. Thus, if user 202 in this example experiences difficulty configuring email application 300 of FIG. 3, user 202 can request context sensitive help information associated with email application 300 by performing a gesture that the device is configured to recognize as a request for help information. For example, the user may have entered the information for Page 1, but then not understand what is requested by the fields of Page 2. In response to the user 202 performing a gesture, mobile device 210 determines whether the gesture corresponds to the predetermined gesture for requesting help. The relevant application program 225 subject to the help request may be identified from among other programs running in parallel on mobile device 210 as the application program displayed to the user 202 at the time the user performed the gesture. In the present example, the relevant application program 225 is the email configuration application 300 generating the pages shown in FIG. 3. If the gesture is determined to be a help gesture, the mobile device 210 will create a help request with information related to the context of the mobile device, which can include the name of the relevant application program 225 (i.e., the application program identified as subject to the help request), status information for the relevant application program 225, such as code and data associated with the last or most recent function of the relevant application program 225, the page presently displayed to the user by the relevant application program 225, any information entered by the user 202, and any information entered into fields of previous pages.

Client application 220 at least partially resides on mobile device 210 and provides gesture based, context sensitive functionality to the user 202. In the present example of a help functionality, client help application 220 determines whether appropriate help content associated with the identified application program 225 (and context thereof) is available in a local memory or data store of mobile device 210. If such help content is determined not to be available locally at mobile device 210, client application 220 sends the help request (S1) to server 240 via network 230. The help request (S1) from client application 220 contains information related to the context of the mobile device, such as the context information described above.

As shown in FIG. 2, server 240 communicates with a local data store or database 245 or with a server on the internet 250 to obtain appropriate help content corresponding to the application program and its context. For example, server 240 uses the empty fields of Page 2, transmitted as part of the context information in help request (S1), to identify help information relating to entering information for those fields. Server 240 further uses the information entered in the fields of Page 1, also transmitted as part of the context information in help request (S1), such as the email address entered by user 202 in field 312, to identify more specific help information. For instance, the email address may indicate the type of email account (e.g., an exchange email account or a Hotmail account), which can be used to identify the particular information that will help the user 202 enter the information requested by the fields in Page 2.

Server 240 may use a combination of previously acquired help content, retrieval of help content, and searches for new help content. For example, database 245 may store a mapping between different help content files and corresponding mobile application programs that are executable at mobile device 210 (or other similar mobile devices). Server 240 sends a request (S2) to the database 245 to determine whether it contains help content relevant to the current state of the device. Server 240 may also send requests to other servers for help content.

If server 240 obtains help content, the server sends the content as a help response (S4) to the client device 210, for presentation to user 202 at mobile device 210 as a response to the help gesture. If database 245 does not have relevant help content, server 240 invokes a search query, for example, by sending a request (S3) to a web server 250 via a separate network. Search results based on the search query are returned in a response (S4) to mobile device 210 and client application 220 via network 230, either directly to the mobile device 210 or to server 240 to be transmitted to mobile device 210, for presentation to the user 202 of mobile device 210. Alternatively, server 240 may transmit a help response (S4) to mobile device 210 that includes an indication that the requested help content for the particular application program is not available, and in response to such indication, client application 220 performs a search query directly. The search query is sent from mobile device 210 in the form of a request to web server 250 through network 230. Client application 220 may be configured to automatically launch a separate web browser application and execute the search query using a preconfigured network address or Uniform Resource Locator (URL) associated with a particular web search engine.

In some implementations, client application 220 is executed in parallel with other application programs running on mobile device 210. For example, these application programs may be executed in a multi-tasking operating environment or computing platform of mobile device 210. As such, user 202 is able to launch multiple application programs installed at mobile device 210 and switch between each of the various programs as desired. Mobile device 210 may be configured to maintain context information for each application program that is currently being executed at mobile device 210 or may obtain context information at the time a user performs a gesture.

In an example, client application 220 is configured to operate as a standalone application or process separate from other application programs running on mobile device 210. In some implementations, client application 220 is a background process or service at mobile device 210. In a case where multiple application programs are running on mobile device 210 in parallel, client application 220 determines the currently executing application program based on, for example, context information present in a program memory in mobile device 210 (e.g., in a program execution or call stack, as described above). The stored context information represents a state or status of the application, and may include, for example, code and data associated with the last or most recent function of the application program that was executed by a processor of mobile device 210. This function may correspond to, for example, a current or most recent page display, a user interface control, or other element of a graphical user interface (GUI) of the particular application program, which the user had accessed or selected at the time of the context switch or other relevant event occurs at mobile device 210. Stored context information may also include recent user input, such as the information entered into the email configuration fields as described above.

In another example, client application 220 is implemented as an event handling function that is triggered based on gesture input from user 202, for example, motion input detected by a motion sensor or other type gesture input detected by another type of sensor of mobile device 210. Operating system and/or particular application program at mobile device 210 generally include one or more event handling functions or routines. Such functions are generally triggered in response to the occurrence of a relevant software or hardware related event at mobile device 210. Examples of such events include software exceptions (e.g., divide by zero error) and hardware interrupts based on user input detected by mobile device 210 in association with a physical hardware component of mobile device 210 (e.g., user presses a hardware key of mobile device 210). Mobile device 210 may be configured to respond to such an event as a trigger to then begin monitoring for specific patterns corresponding to particular gestures or may be configured to constantly monitor for the specific patterns.

In some implementations, client application 220 is implemented as a library that is statically or dynamically linked into one or more application programs for integrating gesture based functionality into preexisting versions of the respective application programs. A benefit of such customized integration of client application 220 into a third-party application program includes customization of context-sensitive functionality specifically for that application program. Customization options include, for example, customized help content (e.g., customizing the type, level of detail or level of context-sensitivity) and customized search queries (e.g., tailoring a search to shopping websites if a shopping application is active or, as described above, using image location information when a search is requested while an image is displayed). For example, help content associated with a particular application program may include an instructional video or a sequence of images (e.g., showing step-by-step instructions for one or more features of the application program). The context-sensitive help information provided to the user as part of the gesture based help functionality for the application program in this example may include providing only the relevant portion or segment of the help video based on the identified current context associated with the application program.

Further, the predetermined physical gesture for invoking or triggering the functionality can be customized. In some implementations, the application program provides an interface that enables the user to customize the predetermined physical gesture for invoking or requesting context-sensitive functionality for the particular application program during its execution at the mobile device. An additional benefit of such a customized physical gesture is that it allows the gesture for the particular application program to be distinguishable from that associated with another application program executable on mobile device 210.

Additional examples and description related to these techniques including, for example, operations of mobile devices 110 and/or 210 of FIGS. 1 and 2, respectively, are provided below with respect to the example method illustrated in the flowchart of FIGS. 4*a* and 4*b*.

Figure 4A:
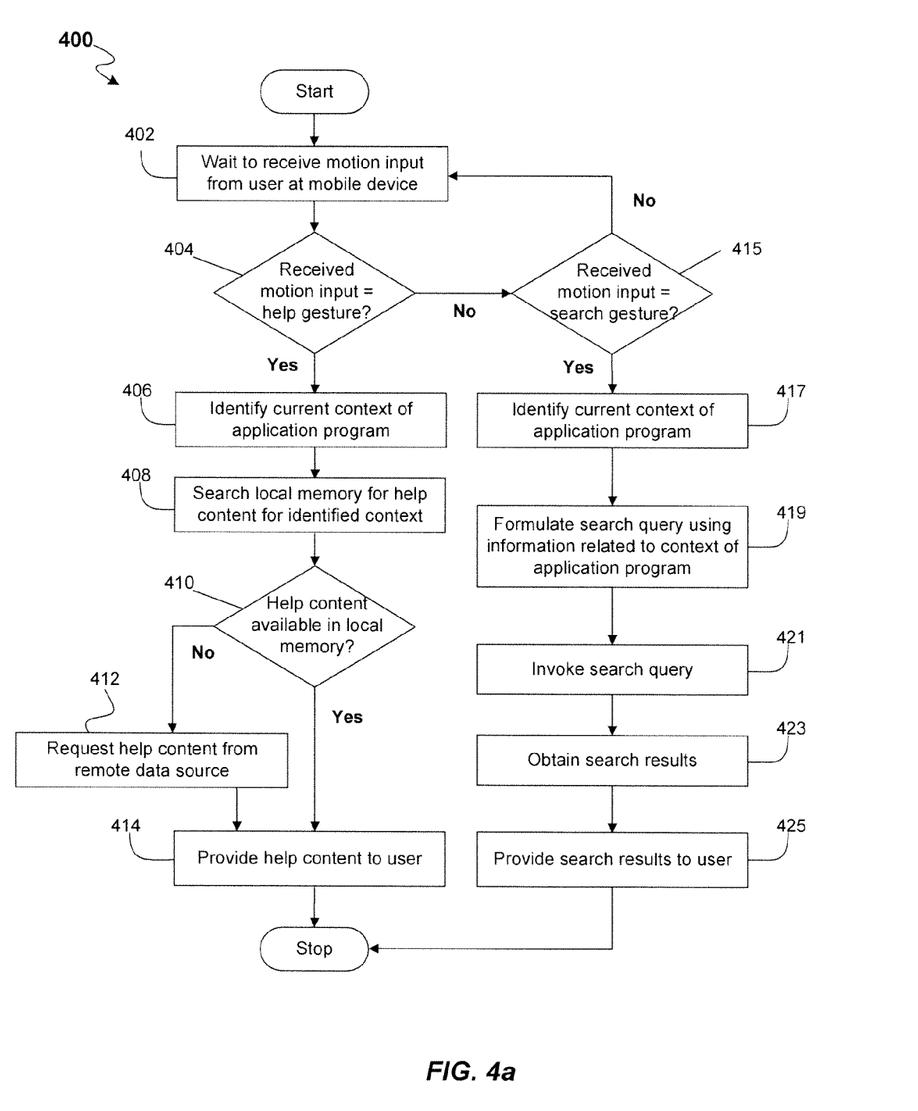
FIG. 4a is a process flowchart of an exemplary method for providing context sensitive help and search functionality to a user of a mobile device based on a physical gesture input by the user at the device.

FIG. 4*a* is a process flowchart of an exemplary method 400 for providing context sensitive functionality to a user of a mobile device in response to a predetermined physical gesture input from the user at the mobile device. For purposes of discussion, method 400 will be described using system 100 of FIG. 1, as described above, but method 400 is not intended to be limited thereto. The steps of method 400 may be performed by, for example, mobile device 110 of system 100 of FIG. 1 alone, or in some combination with server 140.

As shown in FIG. 4*a*, method 400 begins in step 402, which includes waiting to receive input from a user at the mobile device based on physical movement of the device by the user. In an example, the mobile device includes an accelerometer, which is used to detect motion including, for example, a change in the position or orientation of the physical device in three-dimensional space. In this example, the mobile device uses one or more predetermined threshold parameters to determine whether any detected movement of the device is a type of physical gesture input, as opposed to movement caused by regular use of the device by the user (e.g., walking with the device or moving the device to and from the user's pocket). Further, these threshold parameters can be used to distinguish different kinds of predetermined physical gestures for invoking one or more functionalities, including the help or search functionalities, as described herein. Such predetermined threshold parameters can include a predetermined time period of movement and a predetermined rate of movement or acceleration. For example, the mobile device may be configured to invoke the gesture based search functionality associated with the application program executing at the device only when the detected physical movement (or motion input) of the device is determined to exceed the predetermined rate of acceleration on a consistent basis for a time period within a predetermined range of time periods and further configured to invoke the gesture based help functionality when the detected physical movement is determined to exceed the predetermined rate of acceleration on a consistent basis for a time period that beyond the predetermined range of time periods associated with the search functionality.

Upon receiving such motion input, method 400 proceeds to step 404, which includes determining whether the detected motion of the mobile device corresponds to a predetermined physical gesture for invoking the help functionality for an application program currently executing at the mobile device. The predetermined physical gesture may involve, for example and without limitation, moving or shaking the device in rapid succession a predetermined number of times and in a predetermined direction (e.g., back and forth or up and down). If the detected motion does not correspond to the predetermined help gesture in step 404, the method proceeds to step 415 to determine if the detected motion corresponds to a predetermined search gesture. When the detected motion corresponds to a predetermined help or search gesture, method 400 proceeds to steps 406 or 417, respectively, in which the current context of the application program currently executing at the mobile device is identified. If the motion does not correspond to any predetermined gesture based input, the method returns to step 402.

Step 408 includes searching a local memory or data store of mobile device 110 or server 140 for the relevant help content associated with the identified context of the application program. If it is determined in step 410 that the relevant help content is not available locally, method 400 proceeds to step 412, which includes sending a request for the appropriate help content to a remote data source via a communication network 130 as described above in regards to FIGS. 1 and 2.

In some implementations, step 412 further includes submitting a search query via a web search engine accessible to mobile device 110 and/or server 140 through communication network 130. In an example, the search query may be invoked by the mobile device 110 in response to receiving a notification from server 140 indicating that the requested help content is unavailable or server 140 itself may invoke the search query automatically. In this latter example, the server's response includes the results of the search query performed by the server. As described above, the search query is sent to a web server (e.g., server 150 of FIG. 1). For example, the web server 150 may be associated with the search engine or a third-party service provider (e.g., associated with the particular application program for which help content is being requested).

In step 414, the help content is presented to the user via an output of the mobile device. The presented help content may include audio and/or video and may comprise, for example, only the content that is determined to be associated with or relevant to the current context identified (in step 406) for the application program. Step 414 may include, for example, launching an instance of a web browser on the mobile device 110 in order to display search query results, when other help content is not found or in addition to displaying help content.

In step 419 includes formulating a search query for a gesture based, context sensitive search functionality. The search query is formulated using information related to the current context of the mobile device, and may be formulated by the mobile device 110 itself or by a server, such as server 140. The query is invoked in step 421, which may include conducting the search locally on the mobile device 110, conducting the search locally on server 140 (including searches of locally connected databases and/or file systems). Step 421 may also include conducting a search via the Internet 134 by, for example, transmitting the search query to a web site hosting a search engine. The results of the search query are obtained in step 423 and provided to the user of the mobile device 110 in step 425.

Figure 4B:
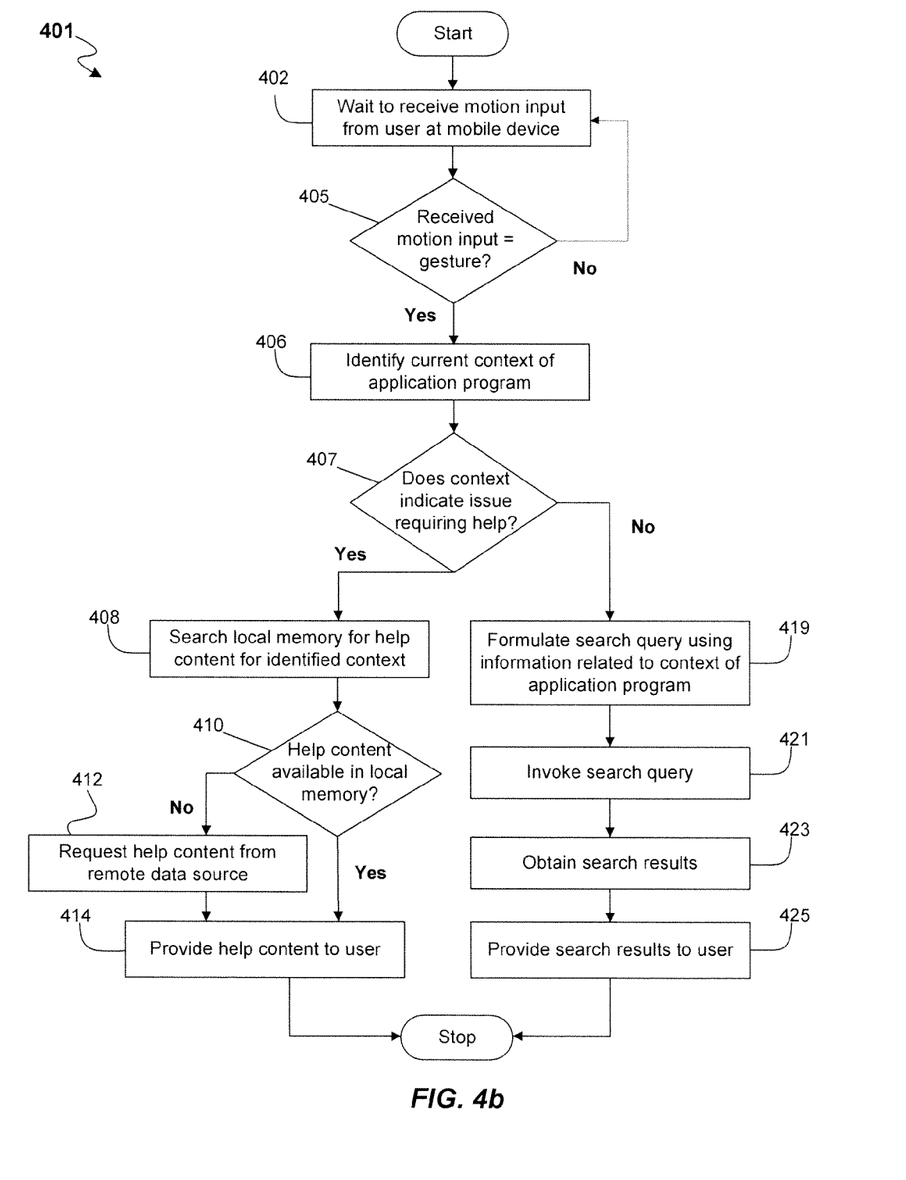
FIG. 4b is a process flowchart of another exemplary method for providing context sensitive help and search functionality to a user of a mobile device based on a physical gesture input by the user at the device.

FIG. 4b is a process flowchart of another exemplary method 401 for providing context sensitive functionality to a user of a mobile device in response to a predetermined physical gesture input from the user at the mobile device. Method 401 of FIG. 4b incorporates step 407, which includes determining whether the context of the mobile device 110 at the time of the gesture based input indicates that there is an issue requiring help. If help is indicated, method 401 proceeds to step 408 to provide the help functionality as described for FIG. 4a. If help is not indicated, method proceeds to step 419 to provide search functionality as described for FIG. 4a.

Figure 5:
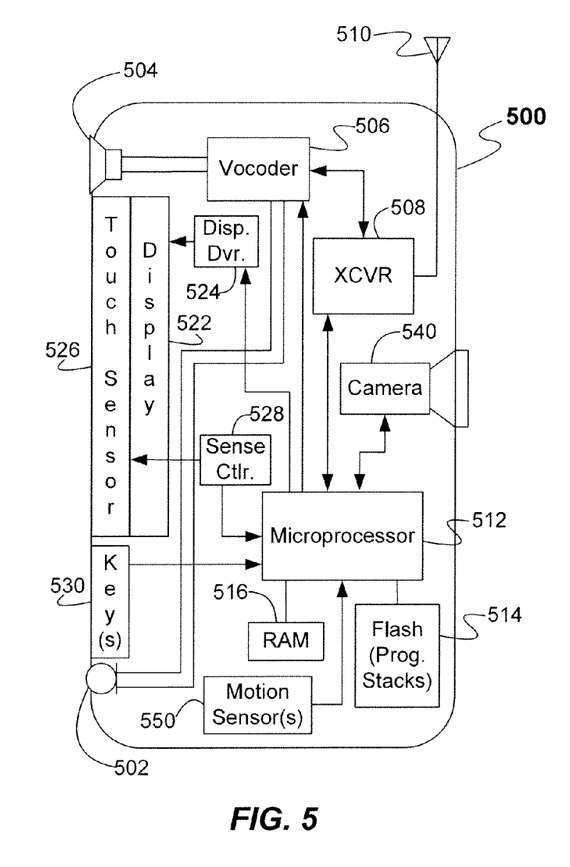
FIG. 5 is a high-level functional block diagram of an exemplary mobile device.

FIG. 5 illustrates a general block diagram of an example mobile device in the form of a mobile handset. For illustration purposes, the present teachings will be described below in reference to a touch-screen type mobile device. In particular, FIG. 5 depicts a touch-screen type mobile device 500 (e.g., a smart phone device or tablet computer). However, the structure and operation of the touch-screen type mobile device 500, as will be described in further detail below, is provided by way of example, and the subject technology as described herein is not intended to be limited thereto. It should be appreciated that the disclosed subject matter may be implemented in a non-touch screen type mobile device or in other mobile or portable devices having communication and data processing capabilities. Examples of such mobile devices may include, but are not limited to, net-book computers, tablets, notebook computers and the like. Referring back to FIGS. 1 and 2, the relevant functional elements/aspects of user devices 110 and 210, respectively, may be implemented using the example mobile device 500 illustrated in FIG. 5.

For purposes of discussion, FIG. 5 provides a block diagram illustration of an exemplary mobile device 500 having a touch-screen user interface. The touch-screen type mobile device 500 includes a microphone 502, speaker 504 and vocoder 506, for audio input and output functions. The mobile device 500 also includes at least one digital transceiver (XCVR) 508, for digital wireless communications, although the mobile device 500 may include an additional digital or analog transceiver. The concepts discussed here encompass examples of the mobile device 500 utilizing any communication interface, such as digital transceivers that conform to current or future developed digital wireless communication standards. Transceiver 508 provides two-way wireless communication of information, such as vocoded speech samples and/or digital information, in accordance with the technology of a network, as described above. The transceiver 508 also sends and receives a variety of signaling messages in support of the various voice and data services provided via the mobile device 500 and the communication network. Each transceiver 508 connects through radio frequency (RF) send and receive amplifiers (not separately shown) to an antenna 510. The transceiver may also support various types of mobile messaging services, such as short message service (SMS), enhanced messaging service (EMS) and/or multimedia messaging service (MMS).

A microprocessor 512 serves as a programmable controller for the mobile device 500, in that it controls all operations of the mobile device 500 in accord with programming that it executes, for all general operations and for operations involved in the procedure for obtaining operator identifier information under consideration here. Mobile device 500 includes flash type program memory 514, for storage of various program routines and mobile configuration settings. The mobile device 500 may also include a random access memory (RAM) 516 for a working data processing memory. Of course, other storage devices or configurations may be added to or substituted for those in the example. Hence, as outlined above, the mobile device 500 includes a processor and programming stored in the flash memory 514 that configures the processor so that the mobile device is capable of performing various desired functions, such as the functions associated with a client application executing on the mobile device.

In the example shown in FIG. 5, the user input elements for mobile device 500 include a touch-screen display 522 (also referred to herein as "display screen 522" or simply, "display 522") and may further include one or more hardware keys 530. For example, the keys 530 may be implemented as a sliding keyboard containing a full alphanumeric keyboard, or may be one or more function keys, such as a home button.

In general, the touch-screen display 522 of mobile device 500 is used to present information (e.g., text, video, graphics or other content) to the user of the mobile device. Touch-screen display 522 may be, for example and without limitation, a capacitive touch-screen display. In operation, touch-screen display 522 includes a touch/position sensor 526 for detecting the occurrence and relative location of user input with respect to the viewable area of the display screen. The user input may be an actual touch of the display device with the user's finger, stylus or similar type of peripheral device used for user input with a touch-screen. Use of such a touch-screen display as part of the user interface enables a user to interact directly with the information presented on the display.

Accordingly, microprocessor 512 controls display 522 via a display driver 524, to present visible outputs to the device user. The touch sensor 526 is relatively transparent, so that the user may view the information presented on the display 522. Mobile device 500 may also include a sense circuit 228 for sensing signals from elements of the touch/position sensor 526 and detects occurrence and position of each touch of the screen formed by the display 522 and sensor 526. The sense circuit 528 provides touch position information to the microprocessor 512, which can correlate that information to the information currently displayed via the display 522, to determine the nature of user input via the screen. The display 522 and touch sensor 526 (and possibly one or more keys 530, if included) are the physical elements providing the textual and graphical user interface for the mobile device 500. The microphone 502 and speaker 504 may be used as additional user interface elements, for audio input and output, including with respect to some functions related to the gesture based help feature, as described herein.

In the illustrated example of FIG. 5, the mobile device 500 also includes one or more digital cameras, such as digital camera 540, for capturing still images and/or video clips. Although digital camera 540 is shown as an integrated camera of mobile device 500, it should be noted that digital camera 540 may be implemented using an external camera device communicatively coupled to mobile device 500. Moreover, while FIG. 5 shows digital camera 540 as being on the opposite side of the touch screen (i.e., directed away from the user), the mobile device 500 may also include one or more front-facing cameras directed toward the user of the device, and either or both can be used as sensors to detect gestures. Digital camera 540 may be configured to detect a predetermined gesture associated with a context-sensitive functionality for an application program executing at mobile device 500, as described previously. The digital camera 540 supplies a digital representation of area within its view to the microprocessor 512, which processes the representations and detects whether they represent a predetermined gesture. In another example, two or more cameras may be used in combination as a stereoscopic camera to detect predetermined gestures occurring within a predetermined range of distances from the mobile device 500.

In this example, mobile device 500 also includes one or more motion sensors, such as motion sensor 550 for detecting motion input from a user. Examples of motion sensors include an accelerometer and/or gyroscope and associated circuitry for signaling microprocessor 512 in response to detected motion input. The detected motion input may include, for example, a change in orientation of the physical device within three-dimensional space, as described above, as well as a determined rate of change in position of the device. In this way, mobile device 500 can use motion sensor 550 to monitor and track the detected motion or physical movement. The tracked motion detected by motion sensor 550 can be used by microprocessor 512 to determine whether the rate of such movement corresponds to a pattern of movement associated with the predetermined physical gesture for invoking the gesture based help functionality described herein. In some implementations, this may include, for example, a determining whether the type of motion and detected rate of motion satisfies one or more predetermined threshold parameters associated with the predetermined physical gesture. Such threshold parameters may include, for example and without limitation, a predetermined rate of acceleration of the detected motion and a predetermined time. For example, microprocessor 512 may use the signaling from motion sensor 550 to determine whether the detected motion or physical movement of mobile device 500 exceeds a predetermined threshold rate of speed or acceleration or whether the change in position or orientation caused by the motion/movement of the physical device occurs in a particular direction or along a particular axis in three-dimensional coordinate space, as described above.

As shown by the above discussion, functions relating to the gesture based help functionality for providing context sensitive help content for an application program may be implemented on a mobile device of a user, as shown by mobile device 110, 210, and 500 of FIGS. 1, 2 and 5, respectively, as described above. However, as noted previously, such functions are not limited thereto. Gesture based context sensitive functionality may be implemented using other mobile devices including, for example, other handheld devices, such as a personal digital assistant (PDA) or handset device, or other devices, such as a laptop computer or tablet computer.

Figure 6:
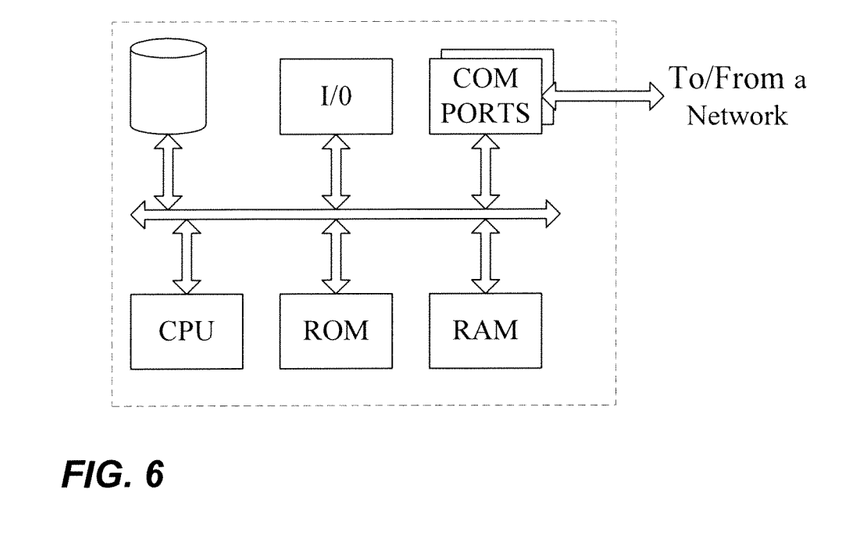
FIG. 6 is a simplified functional block diagram of an exemplary computer that may be configured as a host or server.

FIG. 6 illustrates a high-level functional block diagram of an exemplary network or host computer platform, as may typically be used to implement a server (e.g., any of servers 140, 142 or 144 of FIG. 1 or servers 240 or 250 of FIG. 2, as described above). The general structure, programming, and general operation of such computer equipment are well-known and as a result the drawings should be self-explanatory. As shown in the example of FIG. 6, a server includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. In an example, server functions or operations may be implemented in a distributed fashion on a number of similar platforms, to distribute the processing load.

Aspects of the operations involved in the methods described above may be embodied in programming within the mobile device 110, server MO, or both. Accordingly, aspects of the technology may be thought of as "products" or "articles of manufacture" typically in the form of executable code or process instructions and/or associated data that is stored on or embodied in a type of non-transitory computer readable medium. "Storage" type media include any non-transitory (i.e., non-volatile) tangible memory readable by mobile devices, such as various semiconductor memories, tape drives, disk drives and the like, which provide non-transitory storage at any time for the software programming. All or portions of the software may at times be communicated through the Internet or various other telecommunication networks. Such communications, for example, may enable loading of the software from one computer or processor into another, for example, from a server to a mobile device executing a client of a web application or from a management server to a computer platform of the application or web server that will be hosting a web application or service.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer' or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the steps of processes 400 and 401 of FIGS. 4a and 4b, respectively. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or an does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   a communication interface configured to enable communication via a mobile network;
   a processor coupled with the communication interface;
   a sensor accessible to the processor and configured to detect movement at the mobile device;
   a storage device accessible to the processor; and
   an executable program in the storage device, wherein execution of the program by the processor configures the mobile device to perform functions, including functions to:
   determine whether a detected movement corresponds to either a predetermined help gesture or a predetermined search gesture;
   identify a current context of the mobile device including an application program currently executing at the mobile device in response to the determination that the detected movement corresponds to either a predetermined help gesture or a predetermined search gesture;
   identify a requested functionality as a help functionality or as a search functionality based on the determined corresponding gesture;
   obtain content related to the requested help or search functionality and based on the current context of the mobile device including the identified application program; and
   present the obtained content a user of the mobile device.

2. The mobile device of claim 1, wherein the current context of the mobile device further includes status information for the identified application program when the movement was detected.

3. The mobile device of claim 1, wherein the current context of the mobile device further includes at least a portion of the contents displayed by the mobile device when the movement was detected.

4. The mobile device of claim 3, wherein the current context of the mobile device further includes information entered into at least one field of an interface of the identified application program displayed on the mobile device when the movement was detected.

5. The mobile device of claim 1, wherein obtained content related to a requested help functionality includes one or more results of a search query formulated based on the current context of the application program.

6. The mobile device of claim 1, wherein the sensor is a touch screen configured to detect movement across the touch screen in a predetermined pattern.

7. The mobile device of claim 1, wherein the sensor is a camera configured to detect movement within its view in a predetermined pattern.

8. The mobile device of claim 1, wherein the sensor is a sensor to detect movement of the mobile device in a predetermined pattern.

9. The mobile device of claim 1, wherein the determine function further includes a function to determine whether the movement of the mobile device meets one or more predetermined threshold parameters associated with a predetermined gesture.

10. The mobile device of claim 9, wherein the one or more threshold parameters include a predetermined rate of acceleration and a predetermined time period.

11. The mobile device of claim 1 further comprising a user interface, wherein the program causes the device to provide a gesture control setting panel coupled via the user interface, the gesture control setting panel configured to receive instructions for defining the predetermined gestures for invoking help or search functionalities.

12. A mobile device, comprising:
a communication interface configured to enable communication via a mobile network;
a processor coupled with the communication interface;
a sensor accessible to the processor and configured to detect movement at the mobile device;
a storage device accessible to the processor; and
an executable program in the storage device, wherein execution of the program by the processor configures the mobile device to perform functions, including functions to:
determine whether a detected movement corresponds to a predetermined help gesture or a predetermined search gesture; and
a) identify a current context of the mobile device including an application program identified as currently executing at the mobile device in response to determining that the detected movement corresponds to the predetermined help gesture;
obtain help content based on the current context of the identified application program; and
present the content to the user of the mobile device; or
b) identify a current context of the mobile device in response to determining that the detected movement corresponds to the predetermined search gesture;
generate a search query based on the identified current context, wherein all elements of the search query are identified by the processor;
obtain a response to the search query that includes search results; and
present one or more of the search results to the user of the mobile device.

13. The mobile device of claim 12, wherein execution of the program by the processor also configures the mobile device to perform further functions, including functions to:
determine whether another detected movement corresponds to the predetermined search gesture;
identify a current context of the mobile device when the other detected movement is determined to correspond to the predetermined search gesture;
generate a search query based on the identified current context, wherein all elements of the search query are identified by the processor;
obtain a response to the search query that includes search results; and
present one or more of the search results to the user of the mobile device.

14. The mobile device of claim 12, wherein obtaining help content is further based on context of the identified application program from at least one of code and data associated with the most recent function of the identified application program, or a status of an identified application program page presently displayed by the identified application program, the identified application program page comprising a plurality of user fields.

15. The mobile device of claim 12, wherein obtaining help content is further based on the context of the mobile device including the identified application program, the identified application program comprising data entered into fields of previous pages displayed by the identified application program.

16. The mobile device of claim 15, further comprising searching a local memory for relevant help content.

17. The mobile device of claim 15, further comprising searching a remote data source for relevant help content.

18. A mobile device, comprising:
a communication interface configured to enable communication via a mobile network;
a processor coupled with the communication interface;
a sensor accessible to the processor and configured to detect movement at the mobile device;
a storage device accessible to the processor; and
an executable program in the storage device, wherein execution of the program by the processor configures the mobile device to perform functions, including functions to:
determine whether a motion of the device was performed to request help or whether a motion of the device was performed to invoke a search based on the context of the mobile device;
identify a current context of the mobile device including an application program identified as currently executing at and being displayed on the mobile device in response to the device's motion;
determine whether the program indicates that there is an issue requiring help;
if it is determined that the program indicates that there is an issue requiring help, obtain help content based on the identified application program; and
present the content to the user of the mobile device.

* * * * *